United States Patent
Amagasa et al.

(10) Patent No.: US 8,044,614 B2
(45) Date of Patent: Oct. 25, 2011

(54) WIPER APPARATUS CONTROL METHOD AND WIPER CONTROL SYSTEM

(75) Inventors: Toshiyuki Amagasa, Kiryu (JP); Taku Suzuki, Kiryu (JP); Takashi Kondo, Wako (JP); Toru Namiki, Wako (JP)

(73) Assignees: Mitsuba Corporation, Gunma (JP); Honda Motor Co., Ltd., Tokyo (JP)

( * ) Notice: Subject to any disclaimer, the term of this patent is extended or adjusted under 35 U.S.C. 154(b) by 535 days.

(21) Appl. No.: 12/292,086

(22) Filed: Nov. 12, 2008

(65) Prior Publication Data

US 2009/0119866 A1    May 14, 2009

(30) Foreign Application Priority Data

Nov. 13, 2007   (JP) ................................. 2007-294783

(51) Int. Cl.
    *B60S 1/08* (2006.01)

(52) U.S. Cl. ............... 318/41; 318/62; 318/85; 318/443

(58) Field of Classification Search .................... 318/35, 318/37, 41, 62, 65, 66, 85, 101, 102, 443, 318/444; 15/250.17, 250.27
    See application file for complete search history.

(56) References Cited

U.S. PATENT DOCUMENTS

| | | | | |
|---|---|---|---|---|
| 4,723,101 A | * | 2/1988 | Bauer et al. | 318/443 |
| 5,568,026 A | * | 10/1996 | Welch | 318/443 |
| 6,107,766 A | * | 8/2000 | Amagasa | 318/443 |
| 6,157,154 A | * | 12/2000 | Amagasa | 318/443 |
| 6,288,509 B1 | * | 9/2001 | Amagasa | 318/443 |
| 2009/0119865 A1 | * | 5/2009 | Amagasa et al. | 15/250.31 |

FOREIGN PATENT DOCUMENTS

| | | |
|---|---|---|
| JP | 11-301417 | 11/1999 |
| JP | 2005-502544 | 1/2005 |

* cited by examiner

*Primary Examiner* — Bentsu Ro
(74) *Attorney, Agent, or Firm* — Wenderoth, Lind and Ponack, L.L.P.

(57) ABSTRACT

A wiper apparatus includes: a wiper blade driven by a motor; and a wiper blade driven by a motor. The motors are drive-controlled by control microcomputers, respectively. The control microcomputers are connected to each other through a communication line. While exchanging position information of the wiper blades through the communication line, the control microcomputers synchronously drive the motors on the basis of a position relationship between both of the wiper blades. In the case where a communication abnormality occurs when the position relationship between the wiper blades is in a normal state, the wiper blade is stopped after reaching a lower turning position. In the case where the communication abnormality occurs in a state where the position relationship between the blades is inverted, the blade is stopped after reaching an upper turning position.

7 Claims, 6 Drawing Sheets

WIPER APPARATUS CONTROL METHOD AND WIPER CONTROL SYSTEM

BACKGROUND OF THE INVENTION

1. Field of the Invention

The present invention relates to a control technology for a vehicle wiper apparatus, and more particularly, to a control technology when communication abnormality between motors occurs in an opposite-wiping type wiper apparatus.

2. Description of the Related Art

In recent years, in a vehicle wiper apparatus of an automobile or the like, in particular, in an opposite-wiping type (opposite type) wiper apparatus, a mode has been adopted as disclosed in Japanese Patent Application Laid-open No. Hei 11-301409, in which respective wiper arms on a driver's seat side and a passenger's seat side are individually driven by motors. In such a wiper apparatus as described above, in order that left and right wiper blades (hereinafter, abbreviated as blades as appropriate) cannot interfere with each other on a wiped surface, the motors are individually controlled while confirming position angles of the respective blades. For example, in the apparatus of the above-mentioned publication, the position angles of the left and right blades are always monitored by a wiper control system. A target angle difference is previously set between both of the blades, and while the position angles of the blades are being mutually referred to, speeds of the left and right motors are individually controlled so that a difference between the target angle difference and an actually measured angle difference can become small.

FIG. 5 is an explanatory view illustrating a system configuration of the wiper apparatus as described above. A wiper apparatus 51 of FIG. 5 has a so-called opposite-wiping type configuration in which wiper blades on the driver's seat side and the passenger's seat side are arranged opposite to each other. A blade 52a on the driver's seat side (hereinafter, abbreviated as DR side) and a blade 52b on the passenger's seat side (hereinafter, abbreviated as AS side) perform wiping operations in an opposite manner to each other between upper turning positions set on both end sides of a windshield and lower turning positions set on lower-end center portions of the windshield. A DR-side motor 53a and an AS-side motor 53b are separately provided on the DR side and the AS side, respectively.

The motors 53a and 53b are housed in motor units 54a and 54b, respectively. In the units 54a and 54b, sensors are provided, which output relative position signals (rotation signals) proportional to motor rotation angles and indicating blade movement amounts, and output absolute position signals indicating blade positions. In the units 54a and 54b, control microcomputers 55a and 55b are further provided. The microcomputers 55a and 55b calculate position information (current positions) of the blades 52a and 52b on the basis of the signals output by the sensors in the units. Each of the microcomputers 55a and 55b counts the number of pulses of the relative position signal after the absolute position signal is obtained, whereby the microcomputers 55a and 55b recognize the current positions of the blades 52a and 52b.

The unit 54a on the DR side is connected to an ECU 56 serving as a control device on a vehicle body side. Switch information such as ON/OFF of a wiper switch and LO, HI, and INT thereof are input from the ECU 56 to the unit 54a through an in-vehicle LAN 58. The units 54a and 54b are connected to each other by a communication line 57. Through an intermediation of the communication line 57, the microcomputers 55a and 55b of both of the units 54a and 54b exchange the information regarding the blade positions with each other. The microcomputers 55a and 55b control the motors 53a and 53b to rotate positively and reversely at the upper and lower turning positions, and thereby allow the blades 52a and 52b to perform the reciprocative wiping operations. Further, on the basis of the mutual blade position information of the blades 52a and 52b, the microcomputers 55a and 55b control the motors 53a and 53b to operate synchronously so that both of the blades 52a and 52b cannot interfere with each other and that the angle difference cannot be increased.

Meanwhile, when the communication between the microcomputers 55a and 55b is stopped because a problem occurs in the communication line 57, and the counterpart blade position information of each of the blades 52a and 52b is not input to the microcomputers 55a and 55b, respectively. Therefore, the microcomputers 55a and 55b become incapable of confirming a position relationship between both of the blades, causing a fear in that the blades may interfere with each other at a portion where paths of the wipers overlap each other. As a result, in the system as illustrated in FIG. 5, when the communication between the motors is stopped, the AS-side blade 52b located below the DR-side blade 52a is retreated in the lower reversing direction, whereby a collision between the blades is avoided.

However, in the wiper apparatus 51 of FIG. 5, there is a case in which the position relationship between the left and right blades 52a and 52b is inverted because of any reason. When abnormality occurs in the communication between the motors in this state, there is a fear in that the blades may interfere with each other. Specifically, in the opposite-wiping type wiper apparatus, there is a case in which, owing to an obstacle, an artificial cause, and the like, the AS-side blade 52b usually located below the DR-side blade 52a comes to be located above the DR-side blade 52a, and the position relationship therebetween becomes inverted. Then, when the abnormality occurs in the communication between the motors in this state, and the AS-side blade 52b is retreated in the lower reversing direction as described above, there has been a problem in that the blades may interfere with each other as, illustrated in FIG. 6.

SUMMARY OF THE INVENTION

An object of the present invention is directed to drive a wiper apparatus so that the blades cannot interfere with each other even if communication abnormality occurs in the state where a position relationship between a DR-side blade and an AS-side blade is inverted.

The present invention provides a control method for a wiper apparatus including a first motor that is drive-controlled by a first control circuit, a first wiper blade that is driven by the first motor, a second motor that is drive-controlled by a second control circuit that is connected to the first control circuit through an intermediation of a communication line, and a second wiper blade driven by the second motor. In a normal operation of the first and second wiper blades, in a case of wiping from lower turning positions of wiped areas to be wiped by the first and second wiper blades to upper turning positions of the wiped areas, the first wiper blade wipes the wiped area ahead of the second wiper blade, and in a case of wiping from the upper turning positions to the lower turning positions, the second wiper blade wipes the wiped area in a position relationship of going ahead of the first wiper blade. The control method for a wiper apparatus including: stopping the second wiper blade after the second wiper blade reaches the lower turning position when the communication abnormality occurs between the first control circuit and the second control circuit in a case where the position relationship between the first and second wiper blades is in a state of the normal operation; and stopping the second wiper blade after the second wiper blade reaches the upper turning position when the communication abnormality occurs between the first control circuit and the second control circuit in a case where the position relationship between the first and second wiper blades differs from the position relationship in the state of the normal operation.

In the present invention, in the case where the communication abnormality occurs in the state where the position relationship between the first wiper blade and the second wiper blade is in the normal state, the second wiper blade is stopped after reaching the lower turning position as in the conventional methods. However, in the case where the communication abnormality occurs in such a non-normal state that the position relationship between both of the wiper blades is inverted, the second wiper blade is stopped after reaching the upper turning position in a manner contrary to that in the conventional methods. Therefore, even if the communication abnormality occurs in the state where the position relationship between the wiper blades is inverted, the second wiper blade can be retreated to a region of not interfering with the first wiper blade.

In the control method for a wiper apparatus, when the communication abnormality occurs between the first control circuit and the second control circuit, only the first wiper blade may perform a wiping operation between the lower turning position and the upper turning position while the second wiper blade is being stopped at the lower turning position or the upper turning position. Further, in a case where the wiper apparatus further has a storage position below the lower turning positions, the second wiper blade may be stopped after the second wiper blade reaches the lower turning position or the storage position when the communication abnormality occurs between the first control circuit and the second control circuit in the state where the first wiper blade and the second wiper blade are in the position relationship of the normal operation.

According to the control method for a wiper apparatus of the present invention, when the communication abnormality occurs in the case where the position relationship between the wiper blades is normal, the second wiper blade is stopped after reaching the lower turning position. Meanwhile, when the communication abnormality occurs in the case where the position relationship between the wiper blades is not normal, the second wiper blade is stopped after reaching the upper turning position. For example, even if the communication abnormality occurs in the non-normal state where the position relationship between both of the wiper blades is inverted, the second wiper blade is stopped at the upper turning position. Therefore, the second wiper blade can be retreated to the region of not interfering with the first wiper blade. Hence, even if the communication abnormality occurs in the state where the position relationship between the wiper blades is inverted, interference between both of the blades can be avoided. Therefore, when the communication abnormality occurs, one of the blades can be operated to the maximum within a range of not interfering with the other blade, whereby it becomes possible to ensure a view of a driver.

The present invention provides a wiper control system comprising a first wiper blade that is driven by a first motor, and a second wiper blade that is driven by a second motor, the wiper control system including: a first control circuit that drive-controls the first motor; and a second control circuit that is connected to the first control circuit through an intermediation of a communication line, and drive-controls the second motor. In a normal operation, in a case of wiping from lower turning positions of wiped areas to be wiped by the first and second wiper blades to upper turning positions of the wiped areas, the first and second control circuits operate the first wiper blade to wipe the wiped area in a position relationship of going ahead of the second wiper blade, and in a case of wiping from the upper turning positions to the lower turning positions, the first and second control circuits operate the second wiper blade to wipe the wiped area in a position relationship of going ahead of the first wiper blade, the second control circuit stops the second wiper blade after reaching the lower turning position when a communication abnormality occurs between the first control circuit and the second control circuit in a case where the position relationship between the first wiper blade and the second wiper blade is in a state of the normal operation, and it stops the second wiper blade after reaching the upper turning position when the communication abnormality occurs between the first control circuit and the second control circuit in a case where the position relationship between the first wiper blade and the second wiper blade differs from the position relationship in the state of the normal operation.

In the present invention, in the case where the communication abnormality occurs in the state where the position relationship between the first wiper blade and the second wiper blade is normal, the second control circuit that performs the drive control for the second wiper blade stops the second wiper blade after the second wiper blade reaches the lower turning position as in the conventional systems. However, in the case where the communication abnormality occurs in such a non-normal state that the position relationship between both of the wiper blades is inverted, the second control circuit stops the second wiper blade after the second wiper blade reaches the upper turning position in a manner contrary to that in the conventional systems. Therefore, the second wiper blade can be retreated to the region of not interfering with the first wiper blade even if the communication abnormality occurs in the state where the position relationship between the wiper blades is inverted.

In the control system for a wiper apparatus, when the communication abnormality occurs between the first control circuit and the second control circuit, the first control circuit may operate only the first wiper blade between a lower turning position and an upper turning position regardless of the operation of the second wiper blade. Further, in a case where the wiper apparatus further has a storage position below the lower turning positions, the second control circuit may stop the second wiper blade after the second wiper blade reaches the lower turning position or the storage position when the communication abnormality occurs between the first control circuit and the second control circuit in the state where the first wiper blade and the second wiper blade are in the position relationship of the normal operation.

Further, the second control circuit may include: a data transmission/reception unit that transmits and receives control data with the first control circuit through an intermediation of a communication line; a communication state detection unit that detects a communication state with the first control circuit; a blade position relationship determination unit that determines whether or not the position relationship between the first wiper blade and the second wiper blade is in a normal state; a drive control arithmetic unit that issues an instruction to stop the second wiper blade after the second wiper blade reaches the upper turning position when the communication abnormality occurs with the first control circuit in the case where the position relationship between the first wiper blade and the second wiper blade is not normal;

and a motor drive control unit that stops the second wiper blade after the second wiper blade reaches the upper turning position in accordance with the instruction.

According to the control system for a wiper apparatus according to the present invention, when the communication abnormality occurs in the case where the position relationship between the wiper blades is normal, the second wiper blade is stopped after reaching the lower turning position by the second control circuit that performs the operation control for the second wiper blade. Meanwhile, when the communication abnormality occurs in the case where the position relationship between the wiper blades is not normal, the second wiper blade is stopped after reaching the upper turning position by the second control circuit. For example, even if the communication abnormality occurs in the non-normal state where the position relationship between both of the wiper blades is inverted, the second wiper blade is stopped at the upper turning position. Therefore, the second wiper blade can be retreated to the region of not interfering with the first wiper blade. Hence, even if the communication abnormality occurs in the state where the position relationship between the wiper blades is inverted, the interference between both of the wiper blades can be avoided. Therefore, when the communication abnormality occurs, one of the wiper blades can be operated to the maximum within the range of not interfering with the other wiper blade, whereby it becomes possible to ensure the view of the driver.

DESCRIPTION OF THE PREFERRED EMBODIMENT

Figure 1:
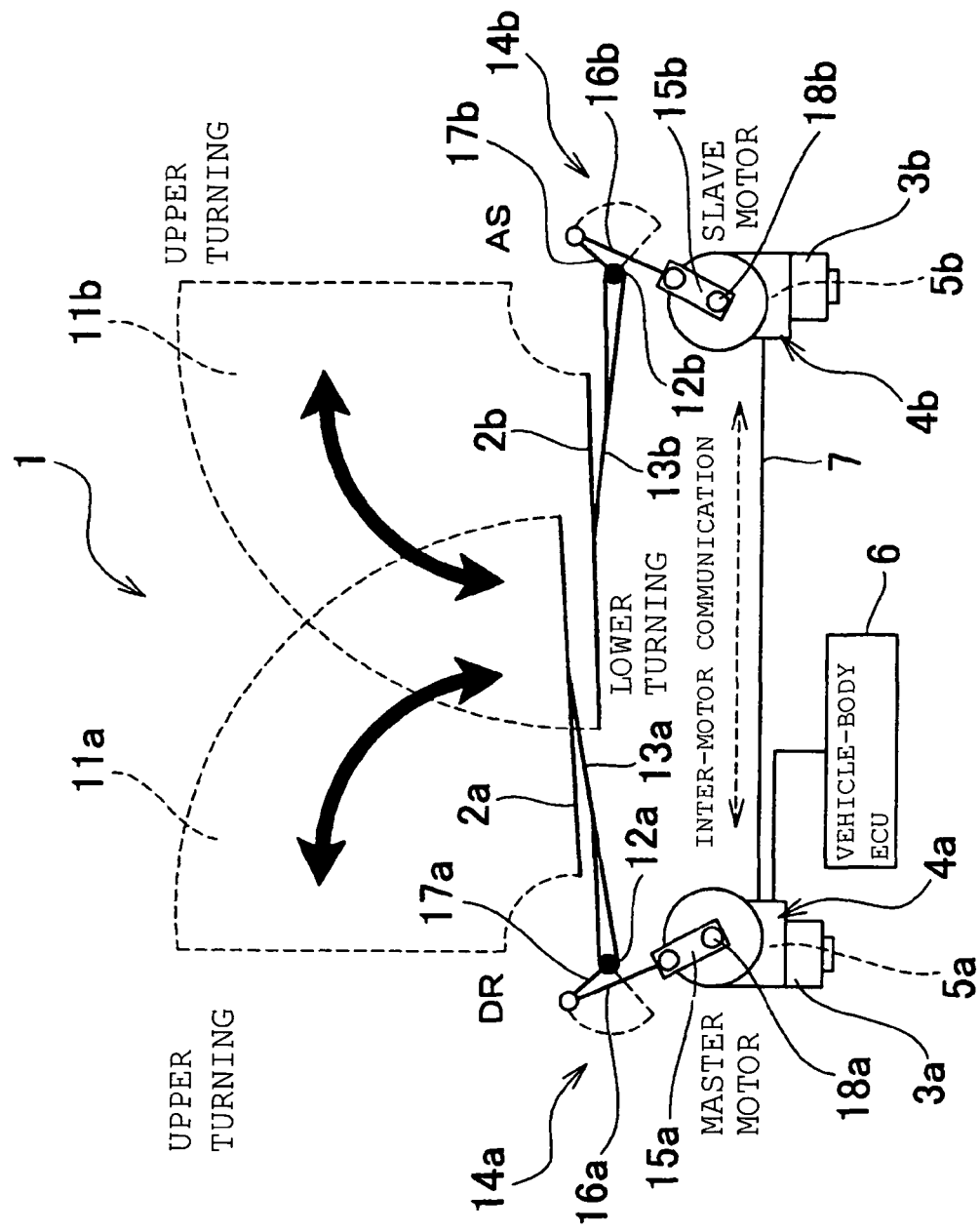
FIG. 1 is an explanatory view illustrating an entire configuration of a wiper apparatus which is driven by a control method and a control system according to an embodiment of the present invention.

A description is made below in detail of an embodiment of the present invention with reference to the drawings. FIG. 1 is an explanatory view illustrating an entire configuration of a wiper apparatus which is driven by a control method and a control system according to the embodiment of the present invention. A wiper apparatus 1 of FIG. 1 is a so-called opposite-wiping type wiper apparatus in which a wiper blade 2a (first wiper blade) of a diver's seat side (hereinafter, abbreviated as DR side) and a wiper blade 2b (second wiper blade) of a passenger's seat side (hereinafter, abbreviated as AS side) are arranged opposite to each other. On the DR side and the AS side, a DR-side motor (first motor) 3a and an AS-side motor (second motor) 3b are separately provided, respectively. Hereinafter, the DR-side motor 3a and the AS-side motor 3b are abbreviated as motors 3a and 3b, respectively. The blades 2a and 2b are driven by the motors 3a and 3b, respectively, and perform wiping operations in an opposite manner to each other between upper turning positions set on both end sides of a windshield and lower turning positions set on lower-end center portions of the windshield. Note that suffixes "a, b" in the reference symbols represent that members and portions denoted thereby are members and portions which are related to the DR side and the AS side, respectively.

Blade rubber members (not shown) are attached onto the blades 2a and 2b. The rubber members are moved on a vehicle windshield while being brought into intimate contact therewith, whereby water droplets and the like, which are present on wiped areas 11a and 11b illustrated by broken lines of FIG. 1, are wiped off. The blades 2a and 2b are supported on wiper arms 13a and 13b fixed to tip ends of wiper shafts 12a and 12b. The blades 2a and 2b perform swing motions in left and right directions by drive systems 14a and 14b using the motors 3a and 3b as drive sources. The drive systems 14a and 14b include link mechanisms including: the motors 3a and 3b; crank arms 15a and 15b; coupling rods 16a and 16b; drive levers 17a and 17b; and the wiper arms 13a and 13b.

The drive levers 17a and 17b are further attached onto the wiper shafts 12a and 12b to which the wiper arms 13a and 13b are fixed. The coupling rods 16a and 16b are attached onto end portions of the drive levers 17a and 17b. Other end sides of the coupling rods 16a and 16b are connected to tip end portions of the crank arms 15a and 15b fixed to output shafts 18a and 18b of the of the motors 3a and 3b. When the motors 3a and 3b are driven, and the output shafts 18a and 18b rotate, the crank arms 15a and 15b rotate. Those motions are transmitted to the drive levers 17a and 17b through an intermediation of the coupling rods 16a and 16b. In this way, rotation motions of the motors 3a and 3b are converted into swing motions of the wiper arms 13a and 13b, and the blades 2a and 2b move reciprocatively between the upper and lower turning positions.

The motors 3a and 3b are housed in motor units 4a and 4b. In the units 4a and 4b, sensors (not shown) are provided, which output relative position signals (motor pulses) proportional to motor rotation angles and indicating blade movement amounts, and output absolute position signals indicating specific blade positions. In the motor units 4a and 4b, there are further provided a control microcomputer 5a (first control circuit) and a control microcomputer 5b (second control circuit), which calculate position information of the blades 2a and 2b on the basis of on the signals output by the sensors. The unit 4a on the DR side is connected through an intermediation of an in-vehicle LAN 8 to an ECU 6 serving as a control device on a vehicle body side. Switch information such as ON/OFF of a wiper switch and LO, HI, and INT (intermittent operation) thereof, vehicle speed information, and the like are input from the ECU 6 with respect to the unit 4a. The units 4a and 4b are connected to each other by a communication line 7. The motor 3a connected to the ECU 6 serves as one on a master side, the motor 3b connected to the motor 3a by the communication line 7 serves as one on a slave side, and in this state, both of the motors 3a and 3b are controlled.

The control microcomputers 5a and 5b of both of the units 4a and 4b mutually acquire counterpart blade position information through the communication line 7. Here, each of the relative position signals as described above is a pulse signal generated in accordance with the rotation of the motor, and the number of pulses, which is proportional to the motor rotation angle, is output. Meanwhile, the absolute position signals are one-shot signals output when the blades 2a and 2b come to the lower turning positions. The number of revolutions of each of the motors 3a and 3b and the number of revolutions of each of the output shafts 18a and 18b are in a constant relationship that is based on a reduction ratio, and hence, a rotation angle of each of the output shafts 18a and 18b can be calculated on the basis of the number of pulses. Meanwhile, the rotation angle of each of the output shafts 18a and 18b and a movement angle of each of the blades 2a and 2b have a constant correlation that is based on the link mechanism of each of the drive systems 14a and 14b. Hence, the number of pulses of each of the relative position signals is summed up, whereby the movement angle of each of the blades 2a and 2b can be confirmed.

In this connection, each of the microcomputers 5a and 5b detects a current position of each of the blades 2a and 2b on the basis of a combination of the absolute position signal indicating the lower turning position and of the number of pulses. While exchanging such pieces of the position information through the communication line 7, the microcomputers 5a and 5b synchronously control the motors 3a and 3b on the basis of a position relationship between both of the blades. Specifically, the microcomputers 5a and 5b first control the motors 3a and 3b to rotate positively and reversely based on the positions of the blades on their own side. In such a way, the blades 2a and 2b perform reciprocative wiping operations between the upper and lower turning positions. At the same time, the microcomputers 5a and 5b control the motors 3a and 3b on the basis of the blade position information of both of the blades 2a and 2b, and thereby control the wiper apparatus 1 so that the blades cannot interfere with each other and that an angle difference cannot be increased therebetween.

Figure 2:
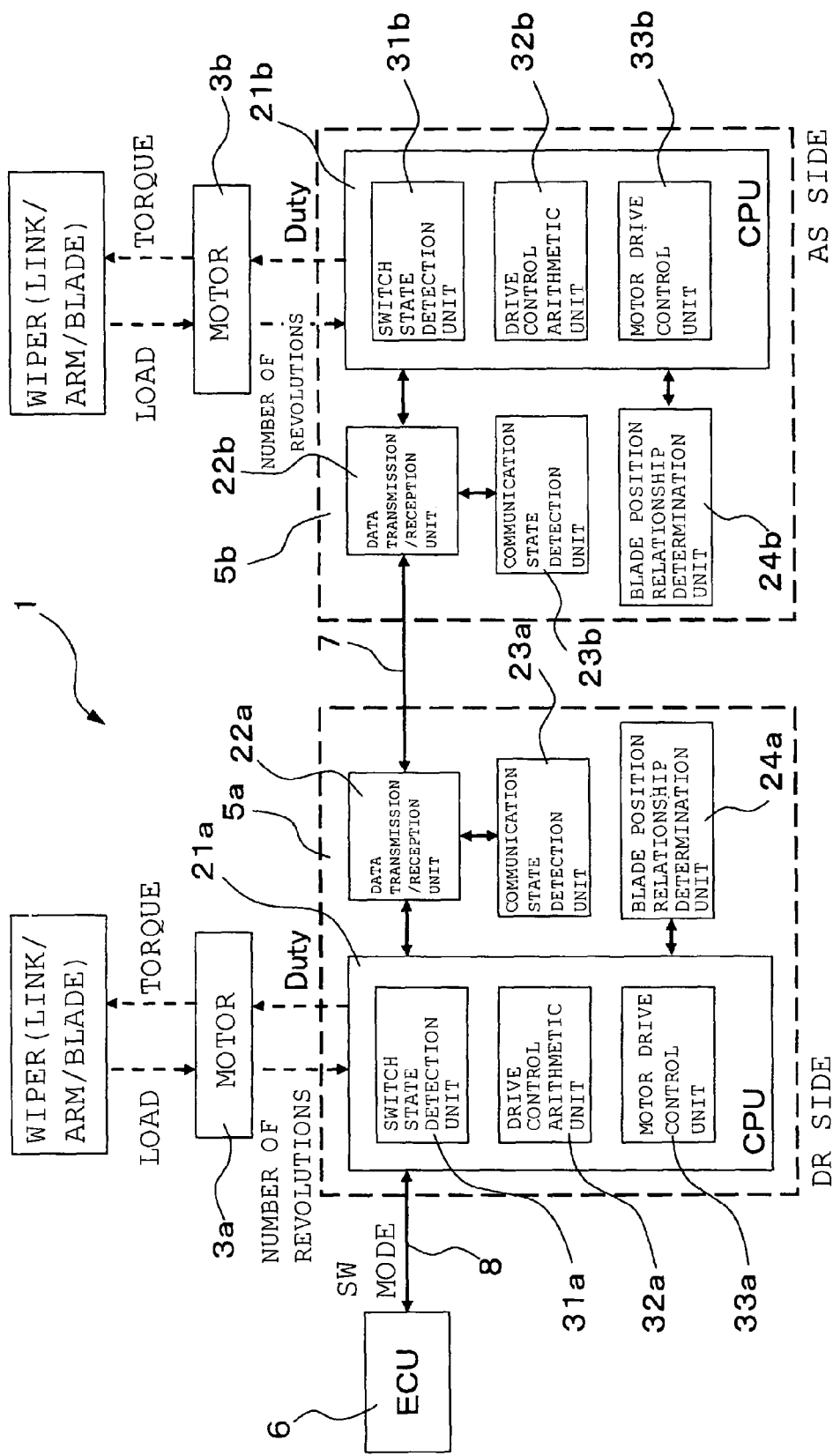
FIG. 2 is a block diagram illustrating a configuration of a control system of the wiper apparatus of FIG. 1.

FIG. 2 is a block diagram illustrating a configuration of a control system of the wiper apparatus 1. The microcomputers 5a and 5b respectively include CPUs 21a and 21b, data transmission/reception units 22a and 22b, communication state detection units 23a and 23b, and blade position relationship determination units 24a and 24b. The CPUs 21a and 21b are central processing units, and in this case, the CPU 21a serves as one on the master side. The CPUs 21a and 21b are connected to the communication line 7 through an intermediation of the data transmission/reception units 22a and 22b, and mutually transfer the position information and operation instructions therethrough. A communication state between the data transmission/reception units 22a and 22b is always monitored by the communication state detection units 23a and 23b. Moreover, the blade position relationship determination units 24a and 24b determine the position relationship between the blades 2a and 2b (that is, determines whether or not the position relationship between the blades is inverted) by using the relative position signals and the absolute position signals, which are sent from the motors 3a and 3b.

An operation mode of the wiper switch is input to the CPU 21a from the ECU 6, and the CPU 21a controls the operation of the motor 3a in accordance with the position information from the microcomputer 5b and on the position information of its own. The CPU 21b serves as one on the slave side, and on the basis of an instruction from the microcomputer 5a, controls the operation of the motor 3b through an intermediation of the communication line 7 in accordance with the position information from the microcomputer 5a and the position information of its own.

In the CPUs 21a and 21b, there are respectively provided switch state detection units 31a and 31b, drive control arithmetic units 32a and 32b, and motor drive control units 33a and 33b. The switch state detection units 31a and 31b detect the current wiper operation mode (ON/OFF; Low, Hi, INT) on the basis of state information (switch information) of the wiper switch, which is input from the ECU 6 through the in-vehicle LAN 8. The drive control arithmetic units 32a and 32b detect the relative position signals and the absolute position signals, and the like from the motors 3a and 3b. Further, the drive control arithmetic units 32a and 32b arithmetically operate a control mode of the motors 3a and 3b on the basis of the current blade positions, the position relationship between both of the blades, the motor speeds, loads, and the like. The motor drive control units 33a and 33b instruct the motors 3a and 3b on rotation directions, duties, and the like on the basis of results of such arithmetic operations of the drive control arithmetic units 32a and 32b, and appropriately operate the blades 2a and 2b between the upper and lower turning positions.

Figure 3:
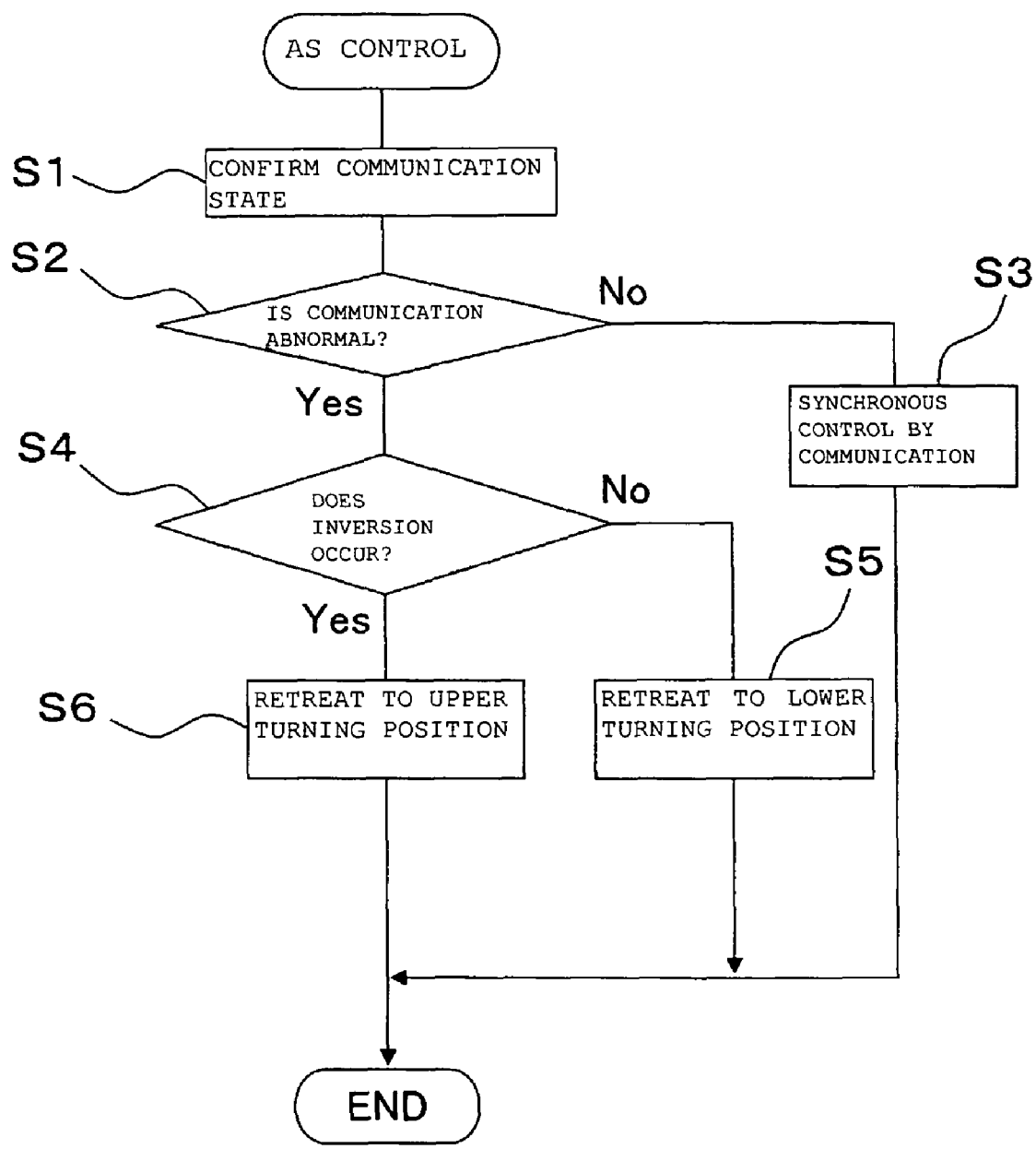
FIG. 3 is a flowchart illustrating a processing procedure for an AS-side blade when communication abnormality occurs in the wiper apparatus to which the present invention is applied.

FIG. 3 is a flowchart illustrating a processing procedure for the AS-side blade 2b in the wiper apparatus 1 having the configuration as described above, and particularly, is a flowchart illustrating a processing procedure when communication abnormality occurs between the DR side and the AS side. As illustrated in FIG. 3, in this case, first, in Step S1, a communication state between the DR side and the AS side is confirmed. Such confirmation of the communication state is executed in the communication state detection units 23a and 23b. In the case where the communication is performed normally, the processing proceeds to Step S3, where a usual synchronization control between the DR side and the AS side is executed by the communication between the motors. Then, the processing leaves this routine. In contrast, in the case where there is abnormality in the communication state between the DR side and the AS side, for example, in the case where the communication is completely stopped owing to a break of the communication line 7 or abnormal data is transmitted therethrough, communication abnormality processing on and after Step S4 is executed.

In this communication abnormality processing, first, in Step S4, it is confirmed that the blades are inverted. Specifically, by the blade position relationship determination units 24a and 24b, it is determined whether or not the blades 2a and 2b are in a normal state (where the DR-side blade is located above the AS-side blade). In the case where the position relationship between both of the blades is normal (that is, where the DR-side blade is located above the AS-side blade), the processing proceeds to Step S5. Then, as before, the drive control arithmetic unit 32b instructs the motor drive control unit 33b to move the blade 2b to the lower turning position. In such a way, the blade 2b is retreated to the lower turning position, and the blade 2a reciprocates on a space above the blade 2b. Hence, even in such a state where the position information of the blade 2b cannot be obtained owing to the communication abnormality, the blade 2a can be operated without any trouble, and the interference between both of the blades is avoided.

Figure 6:
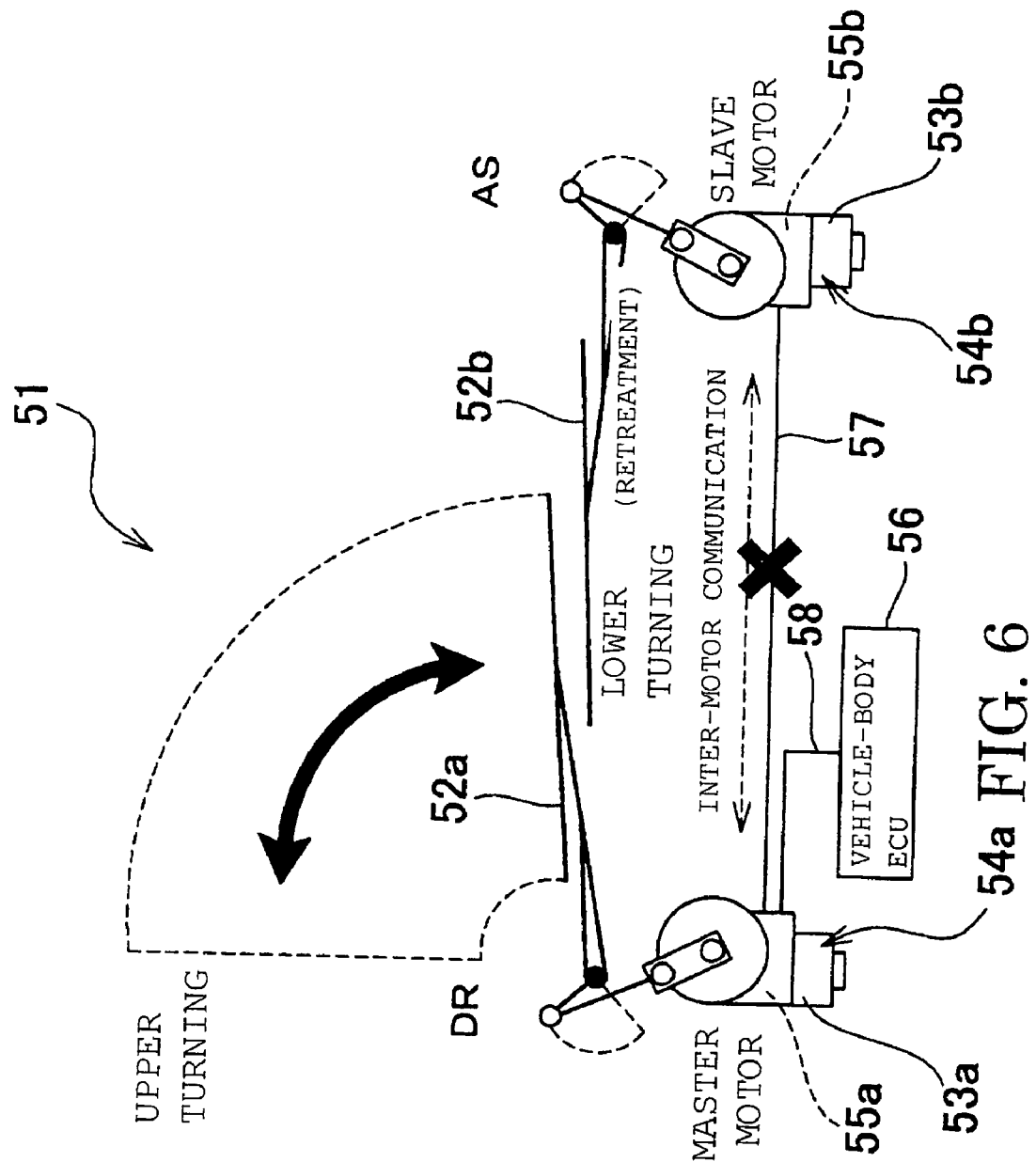
FIG. 6 is an explanatory view illustrating a conventional wiper operation when the communication is stopped.

Meanwhile, in the case where, by the blade position relationship determination units 24a and 24b, it is determined in Step S4 that the blades 2a and 2b are inverted, the processing proceeds to Step S6. In this case, as illustrated in FIG. 6, when the blade 2b is retreated to the lower turning position as before, there is a fear that the blade 2b may interfere with the blade 2a at the time of such a retreat operation. Accordingly, in the control mode according to the present invention, in the case where the position relationship between the blades is inverted, the blade position relationship determination unit 24b issues a message on this fact to the drive control arithmetic unit 32b, and retreats the blade 2b to the upper turning position in a contrary manner to before.

Figure 4:
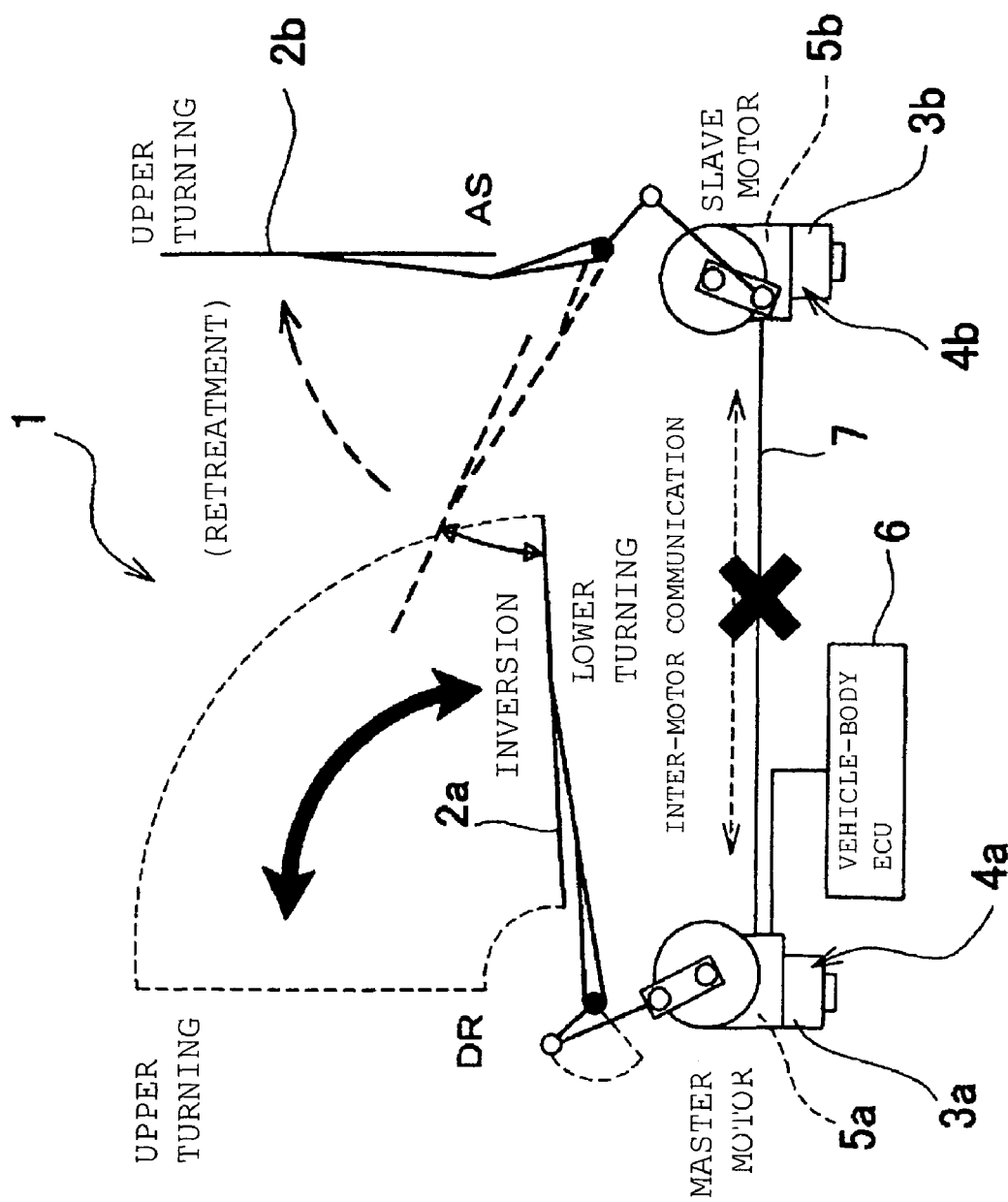
FIG. 4 is an explanatory view illustrating a control mode in a case in which the communication abnormality occurs in a state in which a blade position relationship is inverted.
Figure 5:
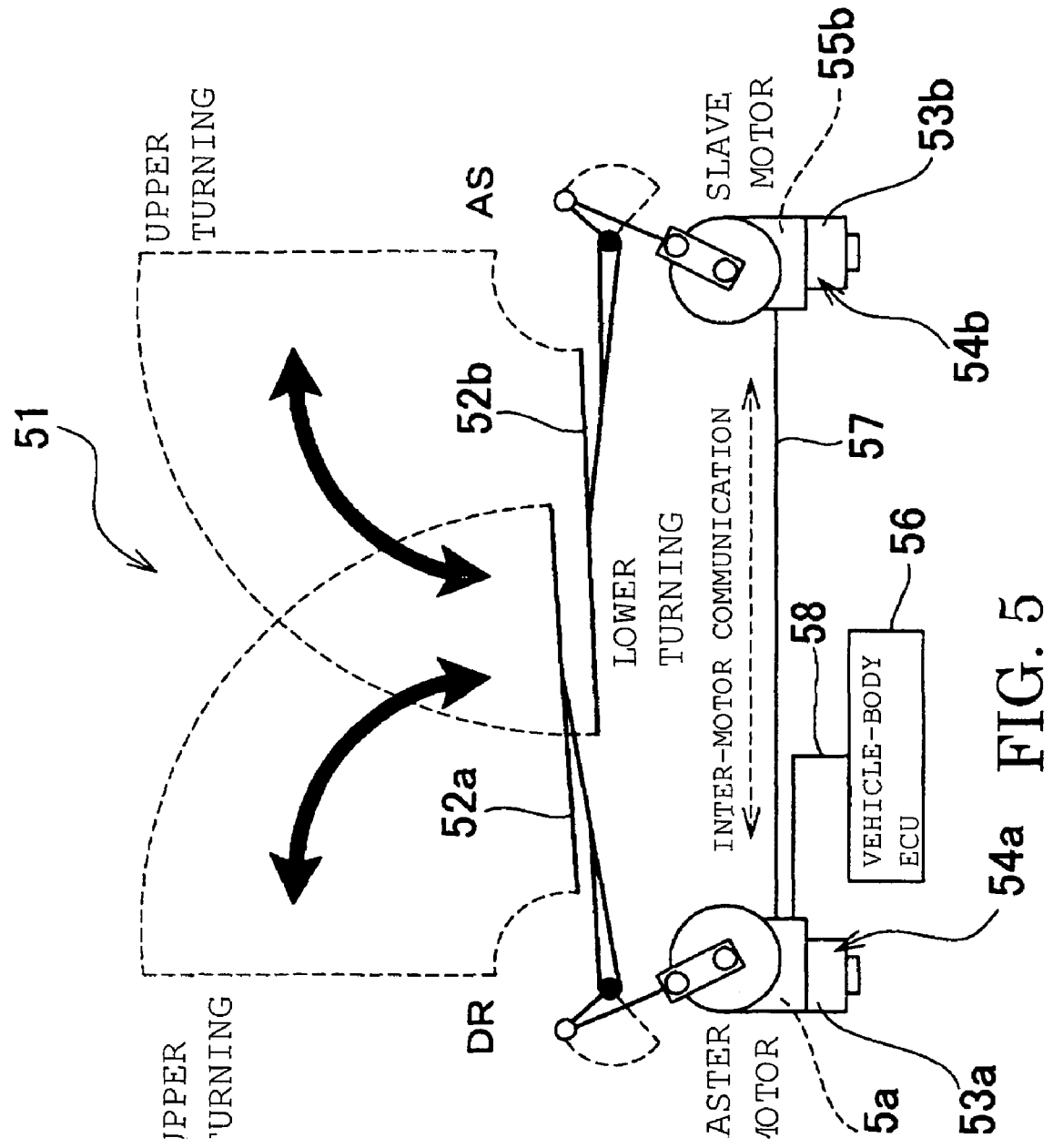
FIG. 5 is an explanatory view illustrating a system configuration of an opposite-wiping type wiper apparatus.

FIG. 4 is an explanatory view illustrating a control mode in the case where the communication abnormality occurs in the state where the blade position relationship is inverted. As illustrated in FIG. 4, in the case where the communication abnormality occurs in the state where the AS-side blade is located above the DR-side blade, the drive control arithmetic unit 32b instructs the motor drive control unit 33b to move the blade 2b to the upper turning position. In such a way, the blade 2b is retreated to the upper turning position, and only the blade 2a performs the reciprocative wiping operation on a space (left side in FIG. 4) below the blade 2b. Specifically, even if the communication abnormality occurs in the state where the blades 2a and 2b are inverted, the blade 2a can be operated without any trouble. Therefore, regardless of the position relationship between the blades, it becomes possible to avoid the interference between both of the blades. Hence, even if the communication abnormality occurs in the state where the position relationship between the blades is inverted, the interference between both of the blades can be avoided, and the blade 2a can be operated to the maximum within a range of not interfering with the blade 2b. In such a way, it becomes possible to ensure the minimum view of a driver. When the wiper switch is turned off, the blade 2a can stop at the predetermined turning position without interfering with the blade 2b.

The present invention is not limited to the above-mentioned embodiment, and it is needless to say that a variety of modifications are possible within the scope without departing from the gist of the present invention.

For example, though the blade 2b is retreated to the lower turning position in Step S6 in the above-mentioned embodiment, the blade 2b may be retreated not to the lower turning position but to a storage position in the case where a wiper apparatus having the storage position is used.

What is claimed is:

1. A control method for a wiper apparatus comprising a first motor that is drive-controlled by a first control circuit, a first wiper blade that is driven by the first motor, a second motor that is drive-controlled by a second control circuit that is connected to the first control circuit through an intermediation of a communication line, and a second wiper blade driven by the second motor, wherein,
in a normal operation of the first and second wiper blades, in a case of wiping from lower turning positions of wiped areas to be wiped by the first and second wiper blades to upper turning positions of the wiped areas, the first wiper blade wipes the wiped area ahead of the second wiper blade, and in a case of wiping from the upper turning positions to the lower turning positions, the second wiper blade wipes the wiped area in a position relationship of going ahead of the first wiper blade, the control method for a wiper apparatus comprising:
stopping the second wiper blade after the second wiper blade reaches the lower turning position when the communication abnormality occurs between the first control circuit and the second control circuit in a case where the position relationship between the first and second wiper blades is in a state of the normal operation; and
stopping the second wiper blade after the second wiper blade reaches the upper turning position when the communication abnormality occurs between the first control circuit and the second control circuit in a case where the position relationship between the first and second wiper blades differs from the position relationship in the state of the normal operation.

2. A control method for a wiper apparatus according to claim 1, wherein, when the communication abnormality occurs between the first control circuit and the second control circuit, the first wiper blade performs a wiping operation between the lower turning position and the upper turning position while the second wiper blade is being stopped at the lower turning position or the upper turning position.

3. A control method for a wiper apparatus according to claim 1, wherein, in a case where the wiper apparatus further has a storage position below the lower turning positions, the second wiper blade is stopped after the second wiper blade reaches the lower turning position or the storage position when the communication abnormality occurs between the first control circuit and the second control circuit in the state where the first wiper blade and the second wiper blade are in the position relationship of the normal operation.

4. A control system for a wiper apparatus comprising a first wiper blade that is driven by a first motor, and a second wiper blade that is driven by a second motor, the control system for the wiper apparatus comprising:
a first control circuit that drive-controls the first motor; and
a second control circuit that is connected to the first control circuit through an intermediation of a communication line, and drive-controls the second motor,
wherein, in a normal operation, in a case of wiping from lower turning positions of wiped areas to be wiped by the first and second wiper blades to upper turning positions of the wiped areas, the first and second control circuits operate the first wiper blade to wipe the wiped area in a position relationship of going ahead of the second wiper blade, and in a case of wiping from the upper turning positions to the lower turning positions, the first and second control circuits operate the second wiper blade to wipe the wiped area in a position relationship of going ahead of the first wiper blade,
the second control circuit stops the second wiper blade after reaching the lower turning position when a communication abnormality occurs between the first control circuit and the second control circuit in a case where the position relationship between the first wiper blade and the second wiper blade is in a state of the normal operation, and it stops the second wiper blade after reaching the upper turning position when the communication abnormality occurs between the first control circuit and the second control circuit in a case where the position relationship between the first wiper blade and the second wiper blade differs from the position relationship in the state of the normal operation.

5. A control system for a wiper apparatus according to claim 4, wherein, when the communication abnormality occurs between the first control circuit and the second control circuit, the first control circuit operates only the first wiper blade regardless of the operation of the second wiper blade.

6. A control system for a wiper apparatus according to claim 4, wherein, in a case where the wiper apparatus further has a storage position-below the lower turning positions, the second control circuit stops the second wiper blade after the second wiper blade reaches the lower turning position or the storage position when the communication abnormality occurs between the first control circuit and the second control circuit in the state where the first wiper blade and the second wiper blade are in the position relationship of the normal operation.

7. A control system for a wiper apparatus according to claim 4, wherein the second control circuit comprises: a data transmission/reception unit that transmits and receives control data with the first control circuit through an intermediation of a communication line; a communication state detection unit that detects a communication state with the first control circuit; a blade position relationship determination unit that determines whether or not the position relationship between the first wiper blade and the second wiper blade is in a normal state; a drive control arithmetic unit that issues an instruction to stop the second wiper blade after the second wiper blade reaches the upper turning position when the communication abnormality occurs with the first control circuit in the case where the position relationship between the first wiper blade and the second wiper blade is not normal; and a motor drive control unit that stops the second wiper blade after the second wiper blade reaches the upper turning position in accordance with the instruction.

* * * * *